000000000
United States Patent Office 2,851,407
Patented Sept. 9, 1958

2,851,407

POLYMERIZATION OF CHLOROTRIFLUORO-ETHYLENE

Mortimer H. Nickerson, Springfield, Mass.

No Drawing. Application March 20, 1952
Serial No. 277,720

8 Claims. (Cl. 204—163)

This invention relates to methods of polymerizing vinyl type monomers, and more particularly chlorotrifluoroethylene, to high molecular weight products.

In a high molecular weight form chlorotrifluoroethylene is an extremely useful material, having among other advantages the ability to withstand a wide range of temperatures without impairment of its physical properties. It is extremely resistant to the action of virtually all known chemicals and no solvent has been found which will dissolve it at room temperature. In addition chlorotrifluoroethylene of high molecular weight possesses excellent electrical characteristics which are further enhanced by the fact that its water absorption is zero. Unlike polytetrafluoroethylene it can be molded and extruded in conventional plastic handling machinery.

Chlorotrifluoroethylene, however, while it shows considerable chemical reactivity at the double bond, is extremely sluggish to polymerize when exposed to conventional polymerization conditions. The use of such aides to polymerization as ultraviolet light, high pressures and accelerators have been proposed but such proposals have been disappointing and either have failed to produce the results claimed for them or where high molecular weight polymers have been obtained the yield has been small and the process costly. Polymerization in a solvent with a catalyst such as benzoyl peroxide yields only low molecular weight oils which have little chemical stability until they have been fluorinated, and such oils have, of course, no utility for molding. Other methods which have been proposed for polymerizing this material to higher molecular weights have indicated that low yields (less than 50%) are obtained after several days.

The polymerization difficulties have been such that relatively small amounts of this extremely useful polymer are commercially available and only at extremely high cost—a cost which is prohibitive for many purposes for which it is ideally fitted.

It is the principal object of this invention to provide a method of polymerizing chlorotrifluoroethylene giving a high molecular weight product and by which yields of 60% to 70% and higher are obtainable in commercial production at a relatively low cost.

A further object is to provide a method, having the above advantages, which can be carried out with simple equipment under mild polymerziation conditions, the polymerization being accomplished in much shorter time than has been indicated for other methods.

A further object is the provision of a catalytic system by which the initiation of the reaction is accomplished under the above conditions.

Another object and advantage is the provision of a method such that the unpolymerized monomer can be easily recovered in pure condition for use in subsequent polymerizations.

A further object is the production of such polymers in an improved form from the point of view of their commercial handling and use.

Other and further objects will be made apparent in the following specification and claims.

An essential and novel condition of the polymerization method of the present invention is that the monomer be agitated in the presence of water but in the absence of any added suspending, dispersing or emulsifying agent of a surface active type, and preferably in the absence of any suspending, dispersing or emulsifying agent. This is contrary to prior practice and to generally accepted theories which prescribe some suspending, dispersing or emulsifying agent when chemical reactions are carried out in two insoluble phases. This limitation on the polymerizing conditions of the present invention is not a matter of choice but is based on the discovery that such agents seem to exert an inhibiting action. Lack of knowledge of the inhibiting action of such agents on the polymerization of chlorotrifluoroethylene has been a substantial factor in the failure of previously proposed methods for polymerization of this material.

When the above condition, among others later pointed out, is observed it has been found that ultraviolet light, in conjunction with aqueous solutions of certain peroxy catalysts, is an effective promotor of the polymerization of chlorotrifluoroethylene. Operating within the limits herein set forth, good yields of high molecular weight polymer are obtained in as little as 16 hours.

Another feature of the polymerizing conditions of the present invention is the initiation of the polymerization by the decomposition of a peroxy catalyst characterized by its dependence on irradiation by ultraviolet light for maintenance of the reaction. In general the suitable ultraviolet light sensitive peroxy catalysts have been found in the water soluble inorganic catalytic peroxides of which hydrogen peroxide and potassium persulfate with sodium bisulfite are examples, hydrogen peroxide being preferable.

Because of the insolubility of the polymer being dealt with, molecular weight determinations cannot be made in the conventional manner and the NST (no-strength temperature) values are used in the following discussions. This NST value is the temperature under which a molded strip of a polymer, which is notched to cross sectional dimensions measuring 3/64" x 1/16", parts at the notch under a load of 0.5 gram. The higher the NST the higher the molecular weight is considered to be.

In carrying out the method of the present invention the ratio of water to monomer may be as great as 10 to 1, but the polymerization is preferably carried out in the range between 4 to 1 and 1.5 to 1. To the water phase there is added as catalyst sufficient hydrogen peroxide so that the catalyst concentration, based on the monomer, lies in the range 0.05% to 1.0% and preferably in the range 0.1% to 0.5%. The reaction mixture is continuously agitated in a gentle but thorough manner so that the immiscible and higher-specific-gravity monomer is kept mechanically suspended in the water. At the same time, the reaction mixture is subjected to ultraviolet light of the type emanating from a high-pressure mercury arc lamp.

A further requirement, if it is desired to produce very high molecular weight material, is that the reaction mixture be kept cool; that is, below 60° F., and preferably between 30° F. and 40° F.; but this condition is only necessary when a product having an NST higher than about 250 is desired.

Hydrogen peroxide is the preferred catalyst, since it has been found that it has no tendency to produce a discolored product. While an exhaustive search on the subject has not been made, a number of other catalysts, such as cumene hydroperoxide, tertiary-butyl hydroperoxide, and benzoyl peroxide, have given either very low yields or no polymer at all when carried out by the methods of this invention. On the other hand, potassium persulfate alone or in combination with sodium bisulfite, gives yields comparable to those obtained with hydrogen peroxide when polymerized by the method of this invention. However, the product so obtained exhibits considerably less heat stability than does the product obtained with hydrogen peroxide; and consequently, when objects are molded with the product from a persulfate polymerization at the customary high temperature, the object may have a dark brown color. The product obtained from a hydrogen peroxide polymerization is nearly water white.

A unique characteristic of the polymerization is that it is initiated most effectively, not by ultraviolet light or peroxide catalyst alone, but by the combination of the two, and proceeds in the absence of any catalyst accelerator. The yields when either the ultraviolet light or the peroxide catalyst are employed alone are negligible compared to the yield obtained when both are used together.

Following are some examples which will illustrate the benefits to be obtained from this system of polymerization. It will be understood that these examples are illustrative only and are not intended to be limiting. The catalyst concentration and the ratio of water to monomer may be varied over a considerable range, as previously indicated.

Example I

Twenty grams of freshly distilled chlorotrifluoroethylene, 40 grams of water, and an amount of hydrogen peroxide equivalent to .076% based upon the monomer were sealed within a heavy-walled glass tube of the type generally referred to as a Carius tube. The tube measured approximately 5/8 inch inside diamter and was about 20 inches long. Approximately one-third to one-half of the space within the tube was unoccupied except by the monomer vapor. This tube was then clamped to a rocking device which tilted the tube back and forth within an angle of about ±30° from the horizontal by means of a motor-driven gear and crank assembly. Facing this tube at a distance of approximately 1 foot was a 300-watt, high-pressure mercury arc lamp having an arc length of 4 inches. The tube was rocked at a frequency of about 50 cycles per minute for a period of 17 hours while exposed to the direct radiation from the arc lamp. At the end of the 17 hours there was obtained a yield of white powdery polymer in an amount equivalent to 88% of the monomer which had been loaded into the tube. The product had a softening point above 200° C.

In an experiment carried out as described above but in the absence of ultraviolet light, there was obtained less than 4% of polymer. When an ordinary incandescent lamp was substituted for the ultraviolet light, a 2% yield was obtained. When the polymerization was carried out as described above but in the absence of any catalyst, no yield was obtained.

Example II

A tube was made up in the manner described in Example I with the charge of the tube consisting of 20 grams of monomer, 40 grams of water, the water containing 1% of potassium persulfate and 0.4% of sodium bisulfite. The rocking tube was exposed to ultraviolet radiation for 16¼ hours, at the end of which time there was obtained a white powdery polymer in a yield of 85%. The product had a softening point of 200° C., but when molded into the form of a disc at a temperature of about 450° F., the product had a dark color.

When the polymerization was carried out as described above but in the absence of ultraviolet light, a yield of 1%, or less, was obtained. If the mixture was irradiated but the water solution contained 1% of Triton X-155 (dimeric alkyl-aryl polyether alcohol), there was obtained a 3% yield of a powdery polymer having a softening point of 120° C. If the water phase in this experiment contained 1% of potassium stearate, there was obtained only a 2% yield of a product having a softening point of 175° C. On the other hand, if the water phase in Example II contained 0.5% of sodium carboxymethyl cellulose, there was obtained in the same length of time an 88% yield of a powdery product having a softening point of 205° C., but the product from this, when molded, was even darker than the product obtained from the persulfate polymerization with no added emulsifying or dispersing agent.

All of the above experiments were carried out at temperatures of the order of 40° C. It has been found that while the temperature does not greatly effect the rate of polymerization it does exert a definite effect upon the molecular weight of the product obtained. This is illustrated in the following examples:

Example III

A reactor was charged with freshly distilled monomer and water in the ratio of 1.85 to 4 together with sufficient hydrogen peroxide to give a concentration of 0.1% based upon the monomer. The temperature of the reactor was controlled by refrigeration. The reaction was agitated and irradiated for 31 hours at a temperature of 40° F. to 50° F. and produced a 70% yield having an NST of 278.

Example IV

Using the process described in Example III but with the temperature maintained at between 30° F. and 40° F. a 60% yield having an NST of 303 was obtained.

The products obtained in the Examples I and II had NST's ranging from 200 to 225. A comparison between these values and the NST's obtained in Examples III and IV indicate the substantial effect that the temperature at which the reaction is carried out has on the molecular weight of the product.

The ratio of water to monomer can be varied over rather wide limits, the principal limitation being the economics of the system on the one hand and the practical difficulties encountered on the other. Increasing the water-to-monomer ratio seems to have a slightly beneficial effect upon the rate of polymerization, but obviously the amount of polymer made in a given size of reactor will diminish considerably as the water-monomer ratio is increased. On the other hand, since, according to the invention, suspending or dispersing agents are eliminated, it is not practicable to decrease the ratio much below 1 to 1 for the reason that the solid polymer clogs up the reactor and impedes the necessary agitation, as well as obstructing the passage of the ultraviolet light. The amount of water should therefore at least be sufficient to maintain mobility of the polymer.

In all of the examples given the pressure used did not exceed the vapor pressure of the monomer at that temperature.

The product from the above polymerizations is a fine white powder or aggregates thereof. Because of the absence of side reactions in the polymerization and the absence of any dispersing or suspending agent, coupled with the fact that the hydrogen peroxide catalyst is a volatile material, the polymer purification is greatly simplified and the product can be simply washed either on a filter or in a centrifuge and dried.

Because the powder is excessively dusty and readily picks up charges of static electricity, it is not too convenient for handling in most molding operations. The material may be converted into a much more convenient form if it is exposed for a brief time (10 to 30 minutes, depending upon the thickness of layer) to a temperature between 500° F. and 575° F. Under these conditions the material partially melts or sinters to a loosely-formed cake which, when subsequently ground up in a mechanical chopping device fitted with a coarse mesh screen, yields a material having the general appearance of coarse sand. This treatment completely eliminates the original dusty character, together with the tendency of the powder to pack and "bridge" in the hopper of an extruder or injection molding machine. The sand-like material obtained by sintering flows freely and behaves much better in the screw of an extruder. Care must be exercised that the polymer is not exposed to temperatures above 575° F. for an excessive period of time, since the effect of very high temperature upon this polymer is to cause a degradation of molecular weight. When the sintering operation is carried out as described above, the degradation is slight and the granular product will be found to have an NST only about 5 degrees lower than the original powdered material. This loss in molecular weight is more than compensated for by the improved handling characteristics of the polymer. If desired the polymer may be dried and sintered at the same operation.

The following exemplifies one manner of carrying out the above method of converting the polymer to an improved form for handling. The washed and dried powder polymer made as described in the previous examples was spread out uniformly on trays to a depth of ⅜ inch, approximately 7 pounds of the polymer covering a tray area of approximtely 20" x 40". The trays used were coated with a fused continuous film of polytetrafluoroethylene to permit easy separation of the sintered polymer from the surface. The trays were then inserted between two electrically heated metal plates approximately 2–3 inches apart. These plates were essentially the same size as the trays and were maintained at a temperature of 550° F. After 20 to 25 minutes the trays were withdrawn and the loosely sintered cake broken up into smaller pieces for feeding to a chopper which reduced the cake to a free-flowing granular material free of dust.

As stated, the polymer may be both dried and sintered in one operation by the above procedures. In that case a somewhat longer time in the oven will be necessary to permit evaporation of water.

In the practice of the invention, due to the fact that the polymerization is carried out in the absence of any dispersing or suspending agent, the unpolymerized monomer can be easily recovered in pure condition for use in subsequent polymerizations. Separation of the pure polymer in its white powder form is a simple matter of washing, either on a filter or in a centrifuge, as above described, to remove the residual acid mother liquors.

The easy recovery of the unpolymerized monomer adds materially to the overall economy of the method. By reason of the high yields of high molecular weight products obtained thereby, the control afforded by variation in the temperature at which the reaction is carried out, and the clarity of the product and other advantages secured by the complete elimination of dispersing or suspending agents, the method of the invention has made possible the commercial production of high molecular weight chlorotrifluoroethylene polymers, in quantities and at prices which makes this material with its highly advantageous properties available to a substantially widened commercial field.

What is claimed is:

1. The method of polymerizing monomeric chlorotrifluoroethylene to directly produce solid polymeric chlorotrifluoroethylene of high molecular weight and commercial purity which method comprises maintaining the monomer dispersed in water containing a volatile, water soluble, ultraviolet light-sensitive peroxy catalyst, solely by mechanical agitation, the amount of water being at least sufficient to maintain mobility of the resulting polymer, the mixture as charged to the reactor consisting solely of water, the monomer and said peroxy catalyst, subjecting the mixture, while the monomer is so mechanically held in suspension in the presence of said catalyst to constant irradiation from a source of ultraviolet light to activate the catalyst, and drying the reaction product to evaporate the water, catalyst residues, and the small percent of volatile hydrolysis products resulting from the unavoidable, minor reaction of monomer with water.

2. The method of polymerizing monomeric cholortrifluoroethylene to directly produce solid polymeric chlorotrifluoroethylene of high molecular weight and commercial purity which method comprises maintaining the monomer dispersed in water containing a volatile, water soluble, ultraviolet light-sensitive peroxy catalyst, solely by mechanical agitation, the amount of water being at least sufficient to maintain mobility of the resulting polymer, the mixture as charged to the reactor consisting solely of water, the monomer and said peroxy catalyst, the latter being present in an amount within the range of 0.05% to 1.0% based on the monomer, subjecting the mixture, while the monomer is so mechanically held in suspension in the presence of said catalyst to constant irradiation from a source of ultraviolet light to activate the catalyst, and washing and then drying the reaction product to evaporate the water, catalyst residues, and the small percent of volatile hydrolysis products resulting from the unavoidable, minor reaction of monomer with water.

3. The method of polymerizing monomeric chlorotrifluoroethylene to directly produce solid polymeric chlorotrifluoroethylene of commercial purity and having an NST of at least 200° C. which method comprises maintaining the monomer dispersed in water containing a volatile, water soluble, ultraviolet light-sensitive peroxy catalyst solely by mechanical agitation, the amount of water being at least sufficient to maintain mobility of the resulting polymer and the catalyst being present in an amount within the range of 0.05% to 1.0% based on the monomer, said mixture as charged to the reactor consisting solely of water, the monomer and said peroxy catalyst, subjecting the mixture, while the monomer is so mechanically held in suspension in the presence of said catalyst and at a temperature below 60° F. and a pressure not substantially exceeding the vapor pressure of the monomer at that temperature, to constant irradiation from a source of ultraviolet light to activate the catalyst, and washing and then drying the reaction product to evaporate the water, catalyst residues, and the small percent of volatile hydrolysis products resulting from the unavoidable, minor reaction of monomer with water.

4. The method of polymerizing monomeric chlorotrifluoroethylene to directly produce solid polymeric chlorotrifluoroethylene of commercial purity and having an NST of at least 200° C. which method comprises maintaining the monomer dispersed in water containing hydrogen peroxide as a catalyst solely by mechanical agitation, the amount of water being at least sufficient to maintain mobility of the resulting polymer and the catalyst being present in an amount within the range of 0.05% to 1.0% based on the monomer, said mixture as charged to the reactor consisting solely of water, the monomer and said peroxy catalyst, subjecting the mixture, while the monomer is so mechanically held in suspension in the presence of said catalyst and at a temperature below 60° F. and a pressure not substantially exceeding the vapor pressure of the monomer at that temperature, to constant irradiation from a source of ultraviolet light to activate the catalyst, and washing and then drying the reaction product to evaporate the water, catalyst residues, and the small percent of volatile hydrolysis products resulting from the unavoidable, minor reaction of monomer with water.

5. The method of polymerizing monomeric chlorotrifluoroethylene to directly produce a yield of at least 50% solid polymeric chlorotrifluoroethylene of commercial purity and having an NST of at least 200° C. which method comprises dispersing the monomer, solely by mechanical agitation, in water containing as catalyst sufficient hydrogen peroxide to bring the catalyst concentration, based on the monomer within the range of 0.1% to 0.5%, the mixture as charged to the reactor consisting solely of water, the monomer and the hydrogen peroxide, constantly agitating the mixture to maintain the monomer in substantially uniform dispersion, and subjecting the mixture while the monomer is so held in mechanical suspension in the presence of the catalyst to irradiation by ultraviolet light of the type emanating from a high pressure mercury arc lamp, while maintaining the mixture at a temperature below 60° F. and a pressure not substantially exceeding the vapor pressure of the monomer at that temperature, to decompose the hydrogen peroxide and initiate polymerization of the monomer, maintaining the agitation and irradiation at said temperature and pressure for a period of between 15 and 35 hours, washing the reaction product and then drying the polymer to evaporate the water, any catalyst residues, and the small percent of volatile hydrolysis products resulting from the unavoidable, minor reaction of monomer with water.

6. The method of polymerizing monomeric chlorotrifluoroethylene which comprises maintaining the monomer dispersed in water containing an ultraviolet light-sensitive peroxy compound solely by constant mechanical agitation, the mixture as charged to the reactor consisting solely of the monomer, the water, and the said peroxy compound, and initiating the polymerization of the monomer by irradiating the constantly agitated mixture with ultraviolet light to effect decomposition of the peroxy compound.

7. The method of polymerizing monomeric chlorotrifluoroethylene which comprises maintaining the monomer dispersed in water containing a water soluble inorganic catalytic peroxide solely by constant mechanical agitation, the mixture as charged to the reactor consisting solely of the monomer, the water, and the said peroxide, and initiating the polymerization of the monomer by irradiating the constantly agitated mixture with ultraviolet light while maintaining the mixture at a temperature between 30° F. and 40° F. to effect decomposition of the peroxide.

8. The method of polymerizing monomeric chlorotrifluoroethylene which comprises maintaining the monomer dispersed in water containing hydrogen peroxide solely by constant mechanical agitation, the mixture as charged to the reactor consisting solely of the monomer, the water, and the said peroxide, and initiating the polymerization of the monomer by irradiating the constantly agitated mixture with ultraviolet light to effect decomposition of the peroxide.

References Cited in the file of this patent

UNITED STATES PATENTS

| | | |
|---|---|---|
| 1,241,738 | Klatte | Oct. 2, 1917 |
| 1,878,267 | Dauler | Sept. 20, 1932 |
| 2,461,089 | Smidth | Feb. 8, 1949 |
| 2,531,134 | Kropa et al. | Nov. 21, 1950 |
| 2,569,524 | Hamilton | Oct. 2, 1951 |
| 2,600,202 | Caird | June 10, 1952 |
| 2,600,683 | Pearson | June 17, 1952 |
| 2,631,998 | Pearson | Mar. 17, 1953 |